United States Patent [19]
Huber

[11] Patent Number: 5,122,263
[45] Date of Patent: Jun. 16, 1992

[54] CONTINUOUSLY AND AUTOMATICALLY FUNCTIONING DEVICE FOR THE DRAINAGE OF SLUDGE, ESPECIALLY OF SEWAGE SLUDGE

[76] Inventor: Hans G. Huber, Zum Rachental 8, 8434 Berching, Fed. Rep. of Germany

[21] Appl. No.: 560,137

[22] Filed: Jul. 30, 1990

[30] Foreign Application Priority Data

Aug. 22, 1989 [DE] Fed. Rep. of Germany ....... 3927642
Dec. 22, 1989 [DE] Fed. Rep. of Germany ....... 3942561

[51] Int. Cl.⁵ .................. B30B 9/14; C02F 11/12
[52] U.S. Cl. .................... 210/110; 210/182; 210/202; 210/298; 210/415; 100/117; 100/145; 198/625; 198/661; 414/218
[58] Field of Search .......... 210/294, 298, 182, 723, 210/728, 415, 110, 780, 751, 202; 100/117, 145, 146, 147, 148, 149, 150; 198/625, 661; 414/218

[56] References Cited

U.S. PATENT DOCUMENTS

| | | | |
|---|---|---|---|
| 3,425,640 | 11/1964 | Kletschke et al. | 414/218 |
| 3,938,434 | 2/1976 | Cox | 100/117 |
| 4,155,299 | 5/1979 | Tuttle | 100/117 |
| 4,193,206 | 3/1980 | Maffet | 210/751 |
| 4,297,208 | 10/1981 | Christian | 100/117 |
| 4,347,135 | 8/1982 | Lafosse et al. | 210/208 |
| 4,380,496 | 4/1983 | Maffet | 210/780 |
| 4,391,561 | 7/1983 | Smith et al. | 198/661 |
| 4,415,336 | 11/1983 | Stasi et al. | 100/145 |
| 4,871,449 | 10/1989 | Lott | 210/110 |

Primary Examiner—Robert A. Dawson
Assistant Examiner—David Reifsnyder
Attorney, Agent, or Firm—Max Fogiel

[57] ABSTRACT

A continuously and automatically functioning device for the drainage of sludge treated with a flocculent, especially of sewage sludge, comprising a screw conveyor installation with a driven conveyor screw consisting of shaft (16) and helix (17) and a screen wall (18). The screw conveyor installation possesses a first cylindrical area (10) of a large diameter and gap width followed by a conical area (12) for purposes of volume reduction in the throughput direction of the sludge. Connected to the conical area (12) of the screw conveyor installation is at least one pressure area (13) which, with the diameter of the shaft (16) being constant, possesses a decreasing lead of the conveyor helix (17) at the side of the entrance, and in its final area carries a conical piece (49) placed upon the shaft (16).

8 Claims, 6 Drawing Sheets

CONTINUOUSLY AND AUTOMATICALLY FUNCTIONING DEVICE FOR THE DRAINAGE OF SLUDGE, ESPECIALLY OF SEWAGE SLUDGE

BACKGROUND OF THE INVENTION

The invention relates to a continuously and automatically functioning device for the drainage of sludge treated with a flocculent, especially of sewage sludge, with a screw conveyor installation with a driven conveyor screw consisting of shaft and helix and a screen wall. Instead of the conveyor screw also the screen wall may be driven in a rotating way and the conveyor screw be stationary. Especially in sewage engineering sludges of the most diverse kinds can be encountered, for example crude sludge, digested sludge, return sludge, excess sludge, scum, etc. which possess a very high water content and a correspondingly low solid-matter content. The automatically functioning device serves the purpose of increasing the solid-matter content of sludge thickened by means of a flocculent. It can be used in sewage engineering, but also in the paper industry and in the manufacture of textiles.

A device of the kind mentioned at the outset is known. The sludge treated with a flocculent is transported to a receptacle in which a stirring shaft with a vertical axis is located. In its lower section the receptacle is conical and is followed by a screw conveyor installation with a horizontal axis, which is equipped with a cylindrical screen wall and possesses a helix by means of which the sludge is drained and compressed. The end of the screw conveyor installation is more or less locked by means of a flap to which a balancing weight may be attached in order to generate a pressure build-up in the interior of the screw conveyor installation. In the area of the screen wall the filtration water is drawn off. The generation of pressure in the screw conveyor installation is only in part suitable for the separation of water. Since the solid-matter quantity contained in the sludge is often of a very fine consistency there exists the hazard that a pressure increase causes the solid particles to be pressed through by way of the openings of the screen wall, while the desired water separation will then not take place anymore. It also happens that the pressure build-up leads to a compression of the solid matter quantity in the range of the screen wall, while in the interior of the screw conveyor installation in the range of the shaft the sludge continues to be relatively moist because in this place the water cannot penetrate to the outside through the compressed solid matter.

Another known device for the drainage of sewage sludge provides a screen zone with a subsequent pressing zone, a jointly driven conveyor screw which consists of shaft and helix extending through these two zones. In the screen zone the housing wall of the screw conveyor installation is designed as screen, while in the pressing zone it is closed. Also in this case the housing is closed to a large degree in the area of the solid-matter delivery chute through the forming of clots so that in this way there will be a back-draft of the solid-matter in the screw conveyor installation. By means of this back-draft a pressure build-up is achieved at the same time.

Moreover, belt presses for the drainage of sewage sludge are known. They are advantageously continuous. However, on the belts a filter cake builds up from the solid matter contents which renders the further penetration of filtration water more difficult. By using such belt presses solid-matter contents of up to 25% can be achieved. While known chamber filter presses are not continuous they render possible higher solid matter contents of up to approximately 36%. The filter cakes possess different degrees of moisture from the core to the outer areas, the interior being the most humid zone.

SUMMARY OF THE INVENTION

It is the object of the invention to create a continuously and automatically functioning device of the type mentioned at the outset by means of which solid-matter contents of up to 25%, up to 30%, even of up to 35% can be reached depending on whether such a solid matter is to be spread on fields for agricultural ends, to be deposited or burnt.

This is accomplished in accordance with the invention by the screw conveyor installation possessing a first cylindrical area of a large diameter and gap width followed by a conical area for purposes of volume reduction in the throughput direction of the sludge, in that succeeding the conical area of the screw conveyor installation at least one pressure area is provided which, with the diameter of the shaft being constant, possesses a decreasing lead of the conveyor helix at the side of the entrance, and in its final area carries a conical piece placed upon the shaft. The screen wall is designed as rotating around 360° in the first cylindrical area, in the conical area and in the pressure area, and these areas are part of a communicating tube with the corresponding build-up of static pressures. In the various areas there is a gentle pressure build-up and back-draft, by which the flocculi generated by the flocculent are not destroyed.

Not only in the first cylindrical area but also in the pressure area again and again new amounts of sludge get into contact with the screen wall. In the various areas the sludge is continuously mixed and kneaded. At the end of the pressure area there is a step for the purpose of backmixing on the one hand and pressure reduction on the other. The elimination of a filter cake at the screen wall having to be maintained for longer periods of time is advantageously avoided because there again and again the sludge is rearranged and mixed. The outlet of the screw conveyor installation is not held shut as is usual in the state of the art. By means of the new device e.g. digested sludge with an initial solid matter content of 3 to 7% may be drained until reaching a solid-matter content of up to 30%, even up to 35%. In the case of excess sludge with an initial solid matter content of 0.5 to 1% the result will be solid-matter contents of 10 to 15%. By incorporating the screen wall with the pressure areas into a communicating tube the device is operating at an elevated pressure level resulting from the sum of the static pressures and the pressure build-up due to back-draft and volume reduction. The communicating tube can be realized in different ways. It is possible, in particular, to arrange the screw conveyor installation at an inclined position, thus at the same time guaranteeing a suitable throw-off height for the sludge delivered from the device. By means of this inclined arrangement a static pressure quantity is brought into effect which decreases in the various areas in the throughput direction. It is possible on the other hand to arrange the screw conveyor installation in a horizontal way and to lead the end of the device upward in a more or less vertical tube and to a chute so that the throw-off height is reached in this way. In both cases the end of the device form the ascending leg of the communicating tube, while the other leg is constituted by a flocculation reactor superposed to the device. Also in the case of this operation at an elevated pressure level there is a relative pressure reduction after each conical part so that also in this case the sludge is again and again mixed, rearranged and kneaded before it is subjected again to a relative pressure increase by means of which a drainage, thickening and ultimately an increase of the solid-matter content is brought about.

In all of these embodiments it is possible to equip the conical area with a closed wall, that is to dispense with the installation of a screen wall or of parts of a screen wall in this conical area. In this manner the back-draft forming in the conical area is increased, which contributes to an improvement of the drainage in the superposed cylindrical area.

The screw conveyor installation may have several pressure areas located in the direction of the throughput in a consecutive sequence, the pressure areas having step-wise increasing shaft diameters and increasing outside diameters of the helix-free conical pieces. The design and the arrangement of several harmonized pressure areas in a consecutive sequence is especially advantageous if high solid-matter contents are to be obtained. In this case it is of no more use to apply a further pressure increase. It is much better to put the sludge repeatedly under pressure in the various pressure areas and to relax it and most of all to take care that there will be a backmixing of the sludge to be drained so that it will always be new parts of sludge that can be drained immediately next to the screen wall. The conical pieces may be designed in a helix-free way. They can be designed as conical pieces and located with its axis coaxially to the axis of the shaft. In another embodiment the conical pieces are essentially designed as helicoidal radially growing pieces and located on the shaft so that radially across the circumference there will be a narrowing of the cross-section ending in a radial step. Also combinations with right cones of a radially helicoidal design are possible. In any case, such a conical piece serves the purpose of generating the back-draft and on the other hand for diameter measurement. Thus the conical piece fulfils no conveying function and is therefore designed in a helix-free way. For this reason one may operate at a pressure level elevated by the static pressure of the communicating tube.

The screw conveyor installation may possess decreasing gap widths in its consecutive pressure areas arranged in the direction of the throughput and harmonized with one another. The higher the number of pressure areas the higher the pressure which may be applied in the subsequent pressure areas, if it is guaranteed that the sludge is always remixed when getting to a new area thus ensuring that such a grading prevents the sludge from penetrating to the outside. It is especially advantageous if the gap width in the cylindrical area is approx. 1–0.5 mm, in the conical area about 0.25 mm and in the subsequent pressure areas further decreasing from 0.25 to 0.1 mm. Hence the gap width always decreases in the throughput direction. An excessive pressure increase in the different pressure areas is avoided. The pressure increase is indeed adjusted to the degree of drainage for purposes of volume reduction. It is very much possible to operate at relatively low pressures. Of importance is also the step at the end of the conical piece. It is in this area that a relaxation of the partly drained sludge is effectuated so that a reorientation of the sludge can be carried out, whereupon another relative pressure build-up takes place.

For the cleaning of the screen wall a rinsing installation for filtration water may be provided. In this way the screen wall can be cleaned and kept free times and again so that no filter cake is allowed to sediment and adhere to the screen wall. The screen wall can be enclosed by a closed outside wall in order to catch and dispose of the filtration water. Connected to or separated from it there may be a heating device for the heating of the sludge to be drained. For this purpose, this heating device is located between the flocculation reactor and the device. It may also be located at the front end of the device, e.g. as heatable floor/bottom, at the beginning of the cylindrical area of the housing of the device. It can also be located in another place. Amazingly, the heating of the sewage sludge favors the drainage.

To the screw conveyor installation a flocculation reactor can be superposed for purposes of pre-thickening in which the flocculant is added. The flocculation reactor may be equipped with a fine screen for a pre-drainage of the sludge. The gap width of the fine screen is about 0.5 mm. There is no pressure build-up, but operation is done exclusively with the help of gravity. The sludge is moved by means of a stirring device so that also in this case there will be remixing and always new parts of sludge getting near the wall of the fine screen.

To the screw conveyor installation a further flocculation reactor may be added located between the first flocculation reactor and the device and equipped with a screen of comparatively greater gap width for the post-thickening of the sludge. Also in the course of this post-thickening again a considerable amount of filtration water is removed.

The device is explained in greater detail and described with the help of preferred examples of embodiments.

BRIEF DESCRIPTION OF THE DRAWINGS

FIG. 8 shows a section according to the line VIII—VIII in FIG. 3 with a modified conical piece.

DESCRIPTION OF THE PREFERRED EMBODIMENTS

Figure 1:
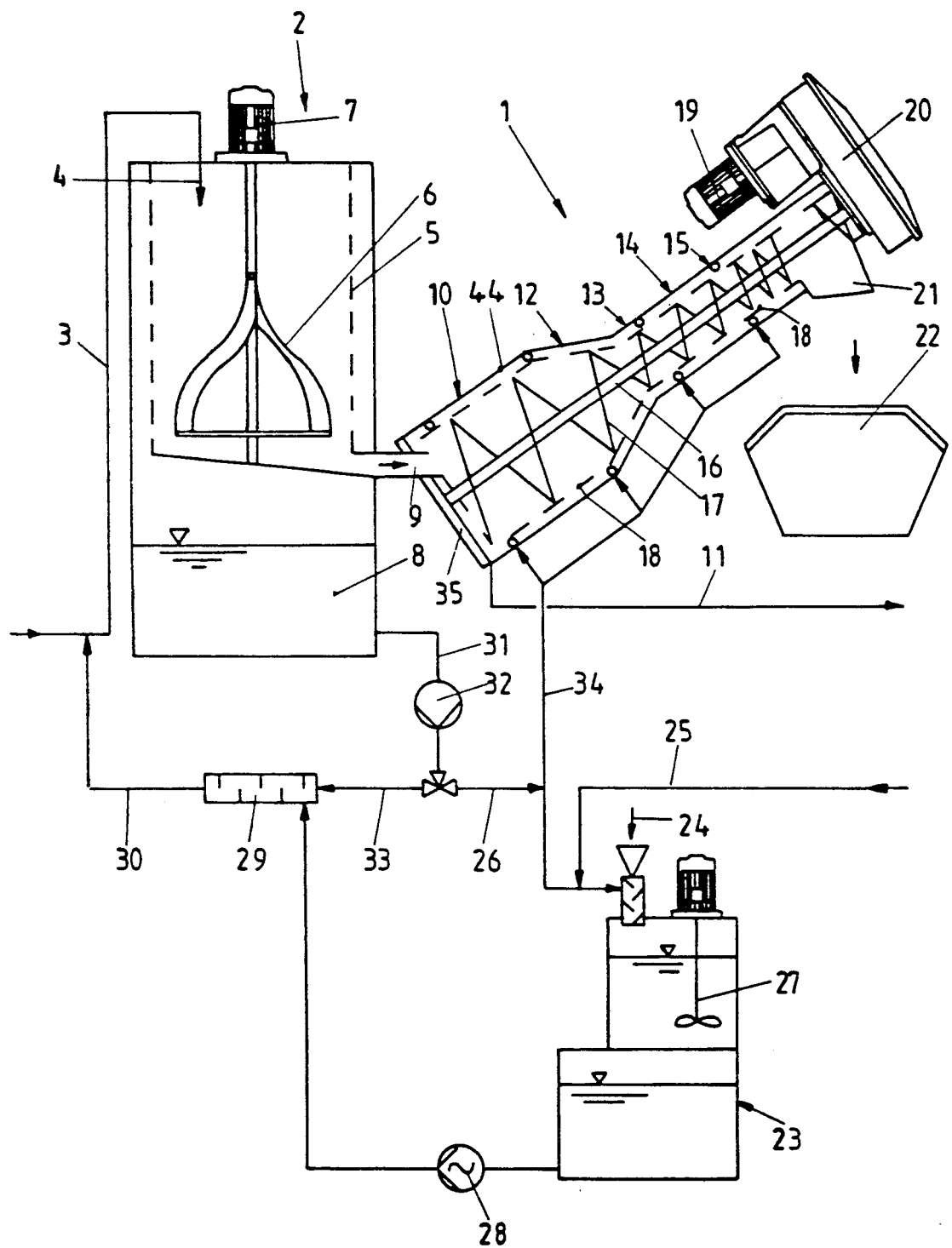
FIG. 1 shows a diagrammatic representation of a sludge draining installation with the new device.

In FIG. 1 the device 1 with an inclined axis is represented in a highly diagrammatic way as an element of a sludge draining device. At first, a flocculation reactor 2 is provided into which the sludge is filled from above by way of a conduit 3 according to arrow 4. In the flocculation reactor a fine screen 5 of approximately cylindrical design is located in whose interior a stirring device 6 is provided driven by a motor 7. In the fine screen 5 only gravity and the motion provided by the stirring device 6 act on the sludge treated with a flocculent so that also in this place again and again new quantities of sludge are brought into contact with the wall of the fine screen 5. A pre-drainage takes place and a filtrate 8 gathers on the bottom of the flocculation reactor. By way of a conduit 9 the pre-drained sludge gets into the device 1, i.e. into a first cylindrical area 10 or a relatively large diameter, where a circulation of the sludge is effectuated. There is still no additional pressure build-up in this place, but only gravity and thus the static pressure act upon the sludge everywhere in the communicating tube. By means of the intensive circulation a considerable amount of filtrate 11 is drained already in the cylindrical area, still before a conical part 12 for purposes of diameter reduction follows. The conical part 12 is ensued by another cylindrical part, more pressure areas 13,14,15 being provided in this place. In the interior of the device 1 a screw conveyor installation is provided possessing a shaft 16 with a helix 17 to which the screen wall 18 is assigned in the several described areas. The screen wall 18 is enclosed by an outside wall 44. The shaft 16 is driven by a motor 19 equipped with a step-down gear 20. By reducing the speed of the shaft 16 the time the sludge remains in the device may be increased. By way of a chute 21 the drained sludge with a solid-matter content of about 30% gets into a receptacle 22. By means of a heating installation 35, e.g. in the form of a heatable bottom at the device 1, the sludge to be treated may be heated when it enters the device 1. Such a temperature increase has positive consequences for the drainage. The entire device 1 with shaft 16 and helix 17 is located in an inclined position so that the sludge treated in the device is conveyed upwards and at the same thrown off from an appropriate height.

A dissolving and dosing receptacle 23 is provided into which the flocculent 24 is introduced and dissolved either in operating water from the conduit 25 or in filtration water from a conduit 26. In the dissolving and dosing receptacle 23 a stirring device 27 is installed. By way of a dosing pump 28, a mixer 29 and a conduit 30 the dosed flocculent 24 gets into the conduit 3 and thus into the flocculation reactor 2. The flitrate 8 resulting at the flocculation reactor 2 may be discharged via a conduit 31 in which a filtration pump 32 is located either into the conduit 26 leading to the dissolving and dosing receptacle 23 or to the mixer 29 by way of a conduit 33. From the conduit 26 the filtrate 8 can also be funneled as rinsing water to the device 1 by way of a conduit 34 and be used for cleaning the screen wall 18.

Figure 2:
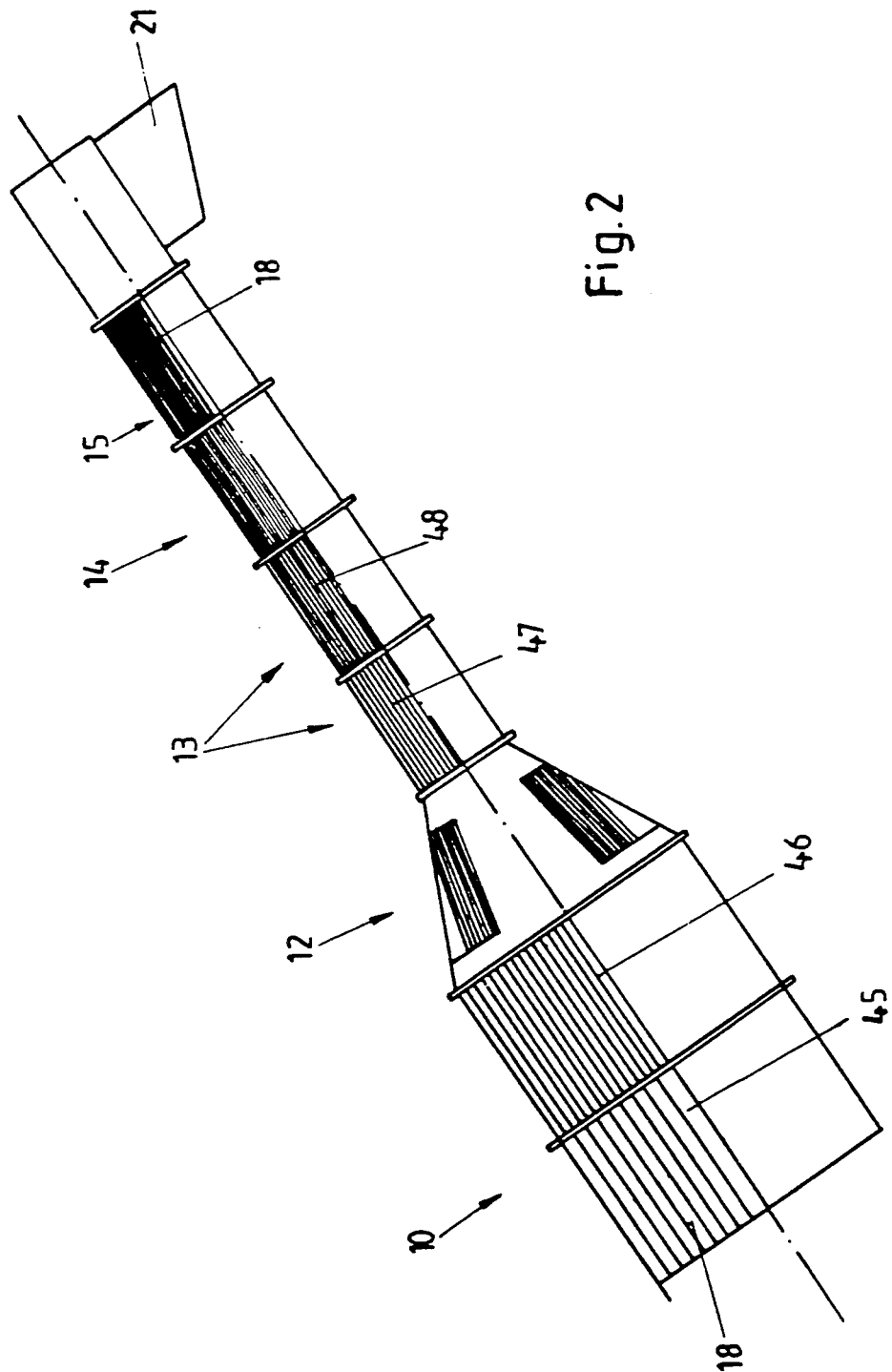
FIG. 2 shows the design of the screen wall of the new device.

In the FIG. 2 the screen wall 18 of the device 1 is represented. The cylindrical area 10 in which the lead of the helix 17 is constant is divided into two areas 45 and 46. The screen wall 18 in the area 45 has a gap width of 1 mm. In the area 46 the gap width is 0.5 mm. The screen wall 18 extends over a circumference of 360°. What follows is the conical part 12 possessing in its truncated part three areas of about 70° distributed over the circumference designed as screen walls, while the remaining part is closed. At this point an essential reduction of the diameter takes place. The gap width is 0.25 mm. Then comes the first pressure area 13 which is twice as long as the ensuing pressure areas 14 and 15. The pressure area 13 is in turn divided into two areas 47 and 48. The gap width in the area 47 is 0.25 mm, while in the area 48 a gap width of 0.2 mm is provided. It is a matter of course that in this place the screen wall 18 is provided for the total circumference of the cylindrical wall. In the pressure area 14 the gap width is 0.15 mm.

In the pressure area 15 a gap width of 0.1 mm is provided. One recognizes that gap widths decreasing in the direction of the throughput are located in a graded way.

Figure 3:
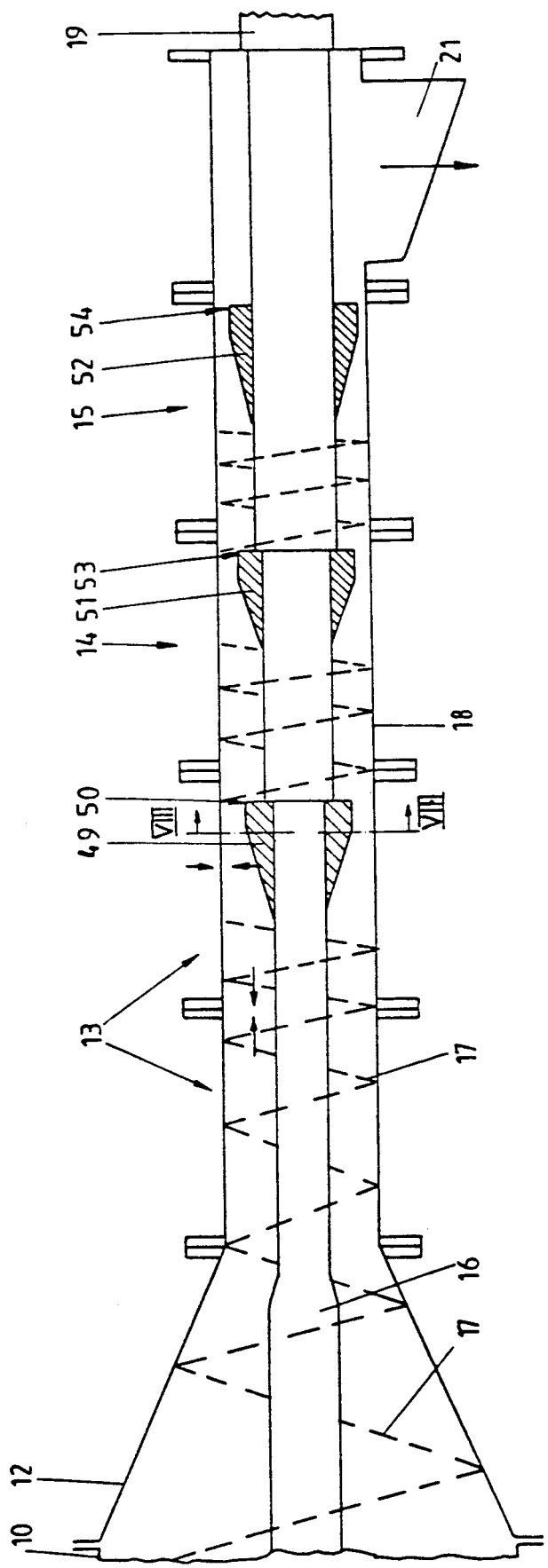
FIG. 3 shows a diagrammatic representation of a part of the device with three pressure areas.

FIG. 3 illustrates the inner structure of the device 1 and of the screw conveyor installation. The cylindrical area 10 is only partly represented. There, the helix has a constant lead. In the range of the ensuing conical part 12 the diameter is reduced. Also the diameter of the shaft 16 is somewhat smaller at the end of the conical area 12.

In the first pressure area 13 the shaft possesses a first diameter and the helix 17 a decreasing lead, so that there is a compression effect already before a conical piece 49 through which the sludge to be drained gets under pressure. Also the conical piece 49 produces a backdraft due to a pressure build-up. In the range of the conical piece 49 the helix 17 is not provided. The outside diameter of the conical piece 49 is adapted to the desired compression effect in this first pressure area 13. At the entrance to the second pressure area 14 the conical part 49 forms a step 50 for purposes of relaxation and pressure reduction so that the sewage sludge that has been partly drained in the first pressure area 13 gets into the second pressure area 14 in a relaxed state. Because of the step 50 the sludge is mixed so that now other parts of the sludge will get into direct contact with screen wall 18 while those parts of the sludge that had been located relatively far at the outside in the pressure area 13 are now directed rather to the inside. Also in the second pressure area 14 the helix 17 possesses decreasing lead. Here the shaft 16 is already of a comparatively greater diameter. Also the conical piece 51 at the end of the pressure area 14 has a greater outside diameter than the conical piece 49 or the first pressure area 13. For this purpose the adjustment has been selected in a way that it is harmonized according to the volume reduction by the filtration water drained in the first pressure area 13. The pressure steps in the various pressure areas 13,14,15 may as well be as large or about as large. In most cases an increase in pressure in the direction is not positive.

The third pressure area 15 is again structured accordingly. The shaft 16 has an even greater diameter. Also the helix 17 has again a decreasing lead and a conical piece 52 possesses a greater outside diameter than the conical piece 51. Also at the conical pieces 51 and 52 steps 53 and 54 are provided and formed that have the same function as the step 50. Therefore, each pressure area 13,14,15 ends with a relaxation, that is a relative pressure reduction and a mixing of the sewage sludge. It is the aim of these pressure areas 13,14,15, the number of which can be varied, to feed the sludge at the same time from the state of reduced pressure times and again to another drainage step, to reach a relative pressure increase and to be able to draw a further quantity of the filtration water. By way of the chute 21 the sludge comes out of the device with a solid-matter content of about 30%. In this form it can be deposited, burnt or composted.

Figure 4:
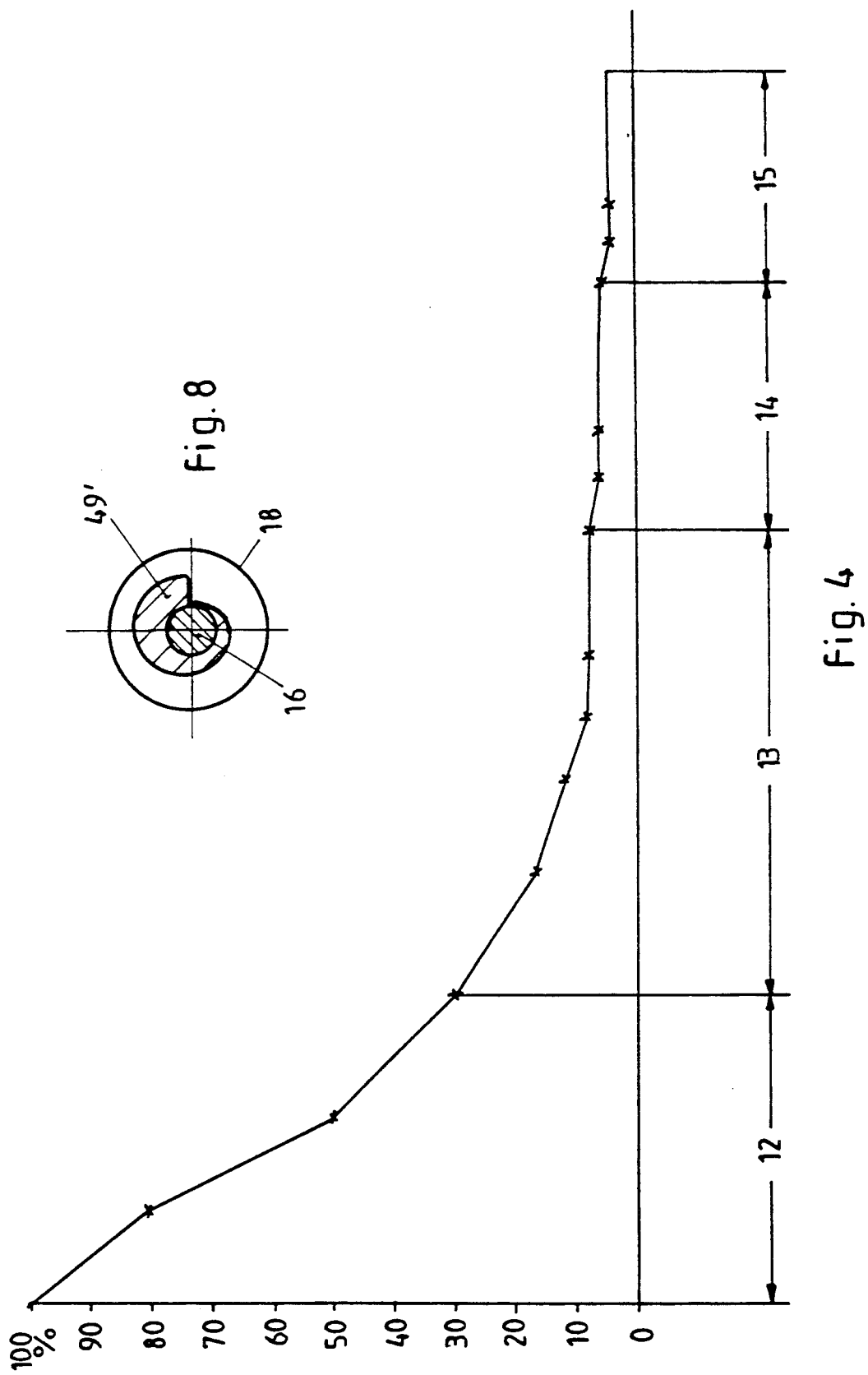
FIG. 4 shows the volume reduction of the device in the throughput direction.

FIG. 4 shows the volume reduction within the device 1 starting at the area of transition from the cylindrical piece 10 to the conical part 12, this is where the penetration area is fully occupied for the first time. It can be seen that there is already a significant volume reduction of about $\frac{1}{3}$ in the conical part 12. In the ensuing pressure areas 13,14,15 the volume reduction is not so significant anymore, which is quite understandable for the solid-matter content increases and it gets constantly more difficult to get filtrate out of the sludge.

Figure 5:
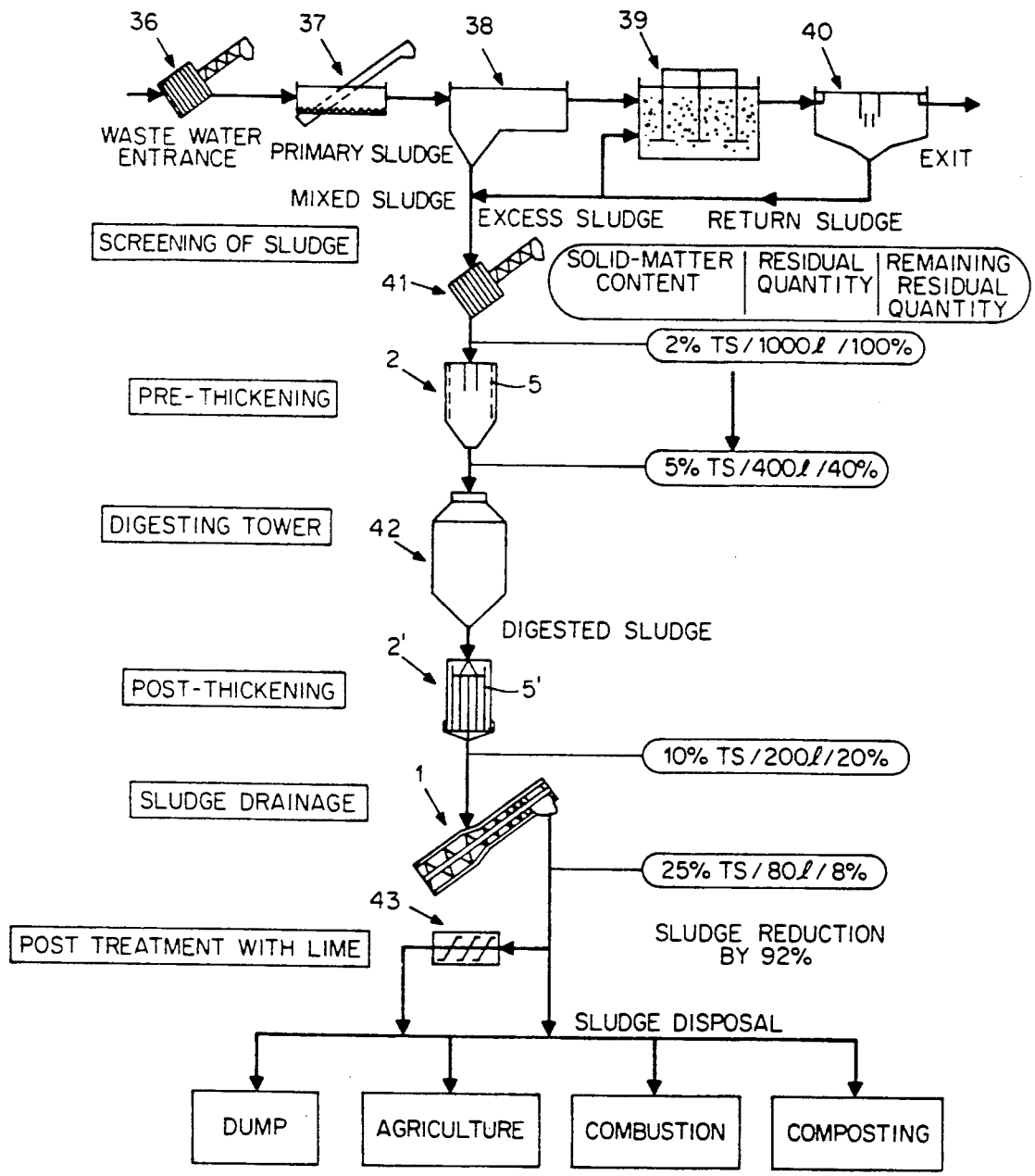
FIG. 5 shows a sludge treatment diagram.

FIG. 5 shows a sludge treatment diagram in which a plurality of different aggregates for the treatment of sludge are arranged in a consecutive order. The treatment of the sludge can take place in this order. Naturally, it is also possible to transport special types of sludge only through part of the aggregates. In general, however, the sludge to be processed will run through a rake 36 and a sand catcher 37 so that rakings and sand are separated from the waste water. This water will then get to a detritus chamber 38 at whose deepest spot primary sludge can be removed. However, it is also possible to transfer the waste water/sludge-mixture to an activated sludge chamber 39 and to a final sedimentation tank 40, in this way producing return sludge and excess sludge.

The different types of sludge can be screened separately or at first as sludge mix. This screening of the sludge is performed in a screening screw 41. The subscreening of the sludge is done because large part of the required maintenance work for ensuing aggregates such as flocculation reactors 2, 2' digestion towers 42, relevant pumps and sludge conduits is due to the fact that coarse matters such as plastic foils, fibres, etc. clog pumps, slides, heat exchangers and conduit pipes. By using a screening screw or of similar screening installations for the screening of sludge these problems can be avoided and the handling of the sludge when further processing the sludge can be made more simple, e.g. in the digestion tower (better floating scum) and finally when removing the sludge, whether by burning it, composting it or using it for agricultural purposes.

At the exit of the screening screw there is sludge with a solid-matter content of 2%. In order to specify the corresponding residual quantities as corresponding number of liters and to represent the remaining residual quantity in % let us assume a quantity to be treated of 1000 l. After the screening the sludge gets into a flocculation reactor 2, where a pre-thickening process takes place. In the course of this process not only the flocculent is added but drainage via a fine screen 5 is done. Primary sludge and especially excess sludge with extremely low solid-matter contents have to be thickened continually so that the design of the pumps, the heat exchangers and especially the dimensions of the digesting towers and the circulating pumps is kept within economical limits. At the exit of the flocculation reactor 2 there is a sludge with a solid-matter content of 5%. Since 60% of the water has already been removed the residual quantity to be treated amounts to 400l or 40% of the initial sludge.

Thus, the ensuing digesting tower 42 is only loaded with this residual quantity. There the digestion of the sludge takes place. This anaerobic stabilization and digestion of the sludge and is the most frequently used method of stabilization. Connected to it is the advantage of obtaining energy from gas. In principle, operation and structure of a digesting tower 42 are known.

To the digesting tower 42 another flocculation reactor 2' may ensue that is designed in a way similar to the flocculation reactor 2. Only the the screen 5' that is installed in it possesses greater gap width than the screen 5 of the flocculation reactor 2. Here, post-thickening is done. Because of the decomposition of organic elements of the sludge during the stabilization (digestion) process the sludge gets more aqueous thus requiring a post-thickening of the sludge with further drainage. At the exit of flocculation reactor 2' there is a sludge with a solid-matter content of 10%. The quantity to be treated has been reduced to 20%. Thus the subsequent device 1 is only loaded with this small residual quantity. There is further drainage effectuated in the device 1. The solid-matter content at the exit of the device 1 is about 25% and may differ depending on the sludge type. Solid-matter contents of up to 30% are possible. The remaining residual quantity is 8% of the loaded quantity or 80l. This high drainage has positive consequences for both accruing transport costs and costs for the further disposal of the sludge at the dump, in agriculture, by burning or compost preparation. With the help of the continuous device 1 and if necessary the other mentioned superposed aggregates much space and time may be saved in comparison with other known sludge processing methods. The sludge at the exit of the device 1 can at first be subjected to lime posttreatment which brings on the advantage that the sludge is hygienized by the admixing of quicklime and can subsequently be spread on fields for agricultural means. On the other hand the solid-matter content can in this way be increased to approximately 35 to 40%, thus reaching a necessary stability for disposal at a dump.

In the device 1 represented in the FIGS. 1 to 3 the screw conveyor installation is located in an inclined way. Connected with the flocculation reactor 2 it forms a communicating tube so that the waste water/sludge-mixture is treated by the additional action of the necessary static pressure. Owing to the inclined arrangement of the device 1 the static pressure in the several areas is of varying degree. In the first cylindrical area 10 of the device there is the greatest static pressure. The interior of this area 10 is fully filled as is the case with the other areas. In the processing direction of the sludge when flowing through the device 1 the static pressure decreases from step to step, since the sludge is always heaved to a higher level. To this part of the static pressure the pressure resulting from the design of the subsequent areas is superimposed. The ensuing conical part 12 which can be equipped either with areas designed in a sievelike way or entirely closed without any penetration area provides not only for a diameter reduction in the direction of the throughput but causes also a backdraft up to the previous cylindrical area 10 which therefore can be more effective. In the following pressure areas 13,14,15 there will still be a relative pressure decrease brought about by the respective conical pieces 49,51,52, in total existing nevertheless, when including the static pressure, an overpressure—even though decreased—at the end of each step 50,53,54. It is important that there will be a relative pressure decrease at each step 50,53,54 so that the sludge will be rearranged, mixed and kneaded so that there will be an equalization of the water content across the section and times and again new parts of sludge get pressed outward until in contact with the screen wall 18 and that in the pressing zones 13,14,15 there will always be a new pressing and kneading process.

Figure 6:
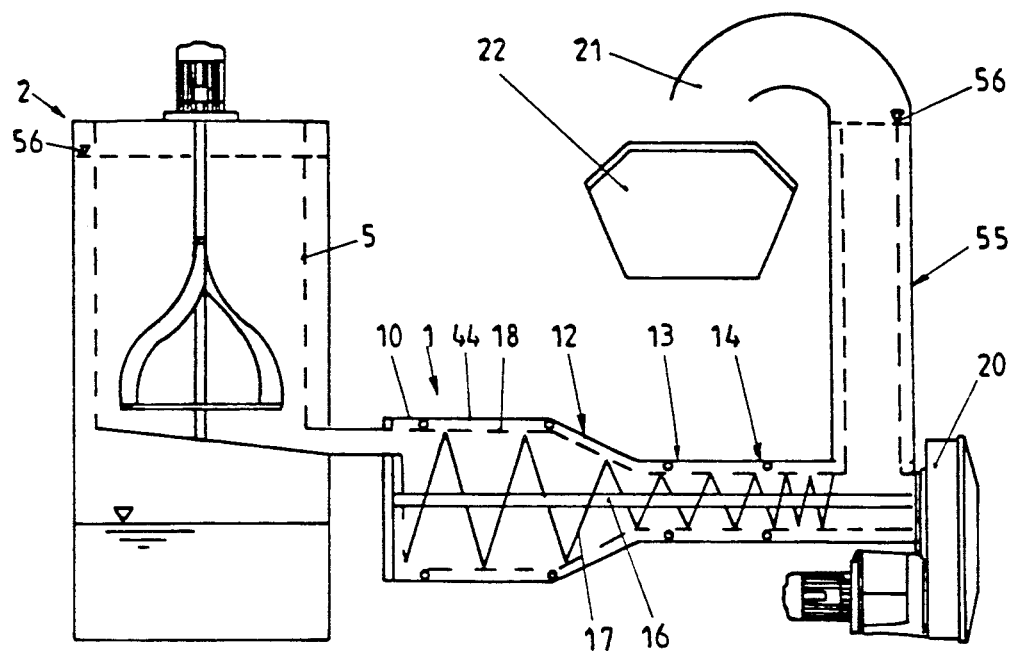
FIG. 6 shows a diagrammatic view of another embodiment of the new device.

FIG. 6 shows an arrangement possibility of the device 1 with the superposed flocculation reactor 2, the axis of the device 1 being arranged in a horizontal way. In this case, the screen wall 18 is designed as rotating around 360° also in the range of the first cylindrical area so that the dam-up pressure will be effective here also. At the end of the device 1 the screen wall 18 and the outside wall 44 are extended into an ascending pipe 55 at the upper end of which the chute 21 for the throwingoff of the drained sludge into the receptacle 22 is provided. In combination with the flocculation reactor 2 and the ascending pipe 55 the device 1 forms a communicating tube so that a level 56 with the necessary static pressure can be effective in the device 1. Due to the horizontal arrangement of the axis of the device 1 the static pressure in the various areas 10,12,13,14 is equally high. It can be seen that by variating the inclination upwards or downwards in the direction of the conveying direction a decreasing or increasing quantity of the static pressure in the throughput direction can be obtained. Also in this case, the gap width in the individual areas 10,13,14 is designed in a step-wise manner and for example similar to the embodiment example described in FIGS. 1 to 3. However, the static pressure is effective not only in the device 1 but also in the flocculation reactor 2 so that at the exit of the flocculation reactor 2 at the point of transition to the device 1 there will be a sludge with a solid-matter content of 10 to 12% if a device 1 according to FIGS. 6 and 7 with a horizontal axis according to the diagram of FIG. 5 is used. The quantity of sludge to be treated when entering the device 1 after the flocculation reactor 2' has been reduced to approx. 20%. At the exit of the device 1 solid-matter contents of up to 35% are possible. The remaining residual quantity amounts to 7% of the loaded quantity or 70 l. It is even possible to increase the solid-matter content to up to 40 or 45%, which is extremely propitious for a burning of the sludge. On the other hand this leads to a higher stability of the sludge when it is brought to a dump. The shaft 16 and/or the helix 17 may possess not represented slots, holes, etc., serving the purpose of further drainage or mixing of the sludge.

Figure 7:
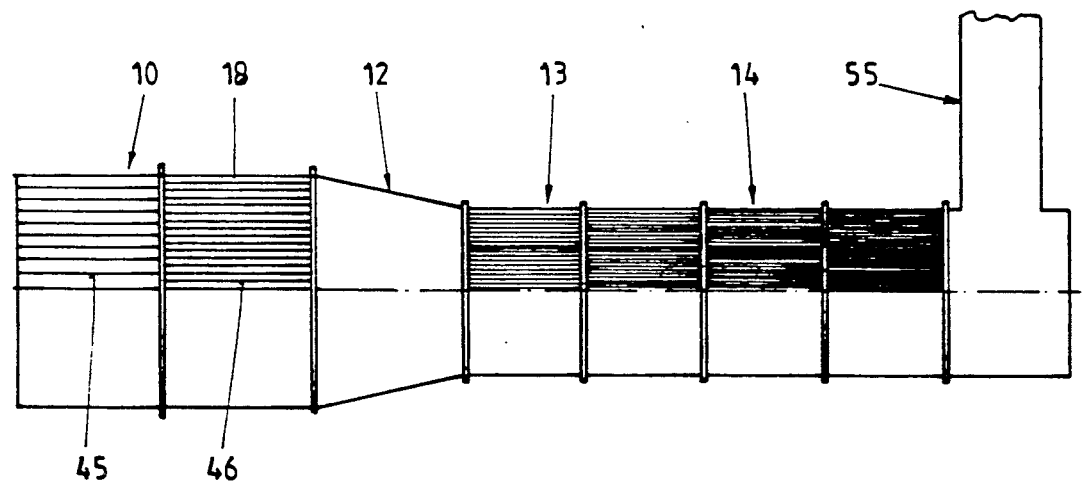
FIG. 7 shows the design of the screen wall of the device according to FIG. 6

FIG. 7 clarifies once more the design of the screen wall 18 in the various areas. The first cylindrical area 10 is subdivided into the two areas 45 and 46. The screen wall 18 is also designed as rotating around 360°. The free penetration area, that is the gap or the holes in the screen wall 18 in the areas 45 and 46, is of varying design and decreasing. The conical area 12 is designed in a fully closed way, meaning that it has no penetration area in the range of its screen wall 18. This area is followed by the two pressure areas 13 and 14 where the gap of holes of the pertaining areas of the screen wall 18 are of further decreasing size. As can be noticed when comparing FIGS. 2 and 7, also the angle of the conical part 12 is chosen as different so that a larger area can be taken advantage of in the subsequent pressure areas 13 and 14 (FIG. 7). In this way the conical part 12 helps reduce the back-draft in the cylindrical area 10 a bit, however, the static pressure quantity couteracts this tendency.

FIG. 8 shows a section according to the line VIII—VIII in FIG. 3 through a conical piece 49' designed in a modified way. The conical piece 49' is designed in spiral shape with increasing diameter and placed onto the shaft 16 to which it is connected in a rigid way. This leads also to a narrowing of the section in the radial direction across the circumference if the shaft is 16 driven in a rotating way. The spiral design of the conical piece 49' relates in this case to 360° and ends also in this case in a step providing a relative relaxation of the pressure and a mixing and rearrangement of the sewage sludge. This radial narrowing of the section can be applied in a combined way with the axial sectional narrowing represented in FIG. 3. Also the other conical piece 51 and 52 of the different pressure areas can consequently be adapted accordingly.

I claim:

1. A continuously and automatically operating arrangement for draining sewage sludge treated with a flocculent, comprising: a screw conveyor having a driven screw with a shaft and a helix; a screen wall surrounding said driven screw; said screw conveyor having a first cylindrical wall enclosing a substantially large cross-sectional area and a first part of said screen, said first part of said screen having substantially large screen openings; a conical closed wall connected to said first cylindrical wall and having a cross-sectional area that decreases in direction of flow through said screw conveyor; a pressure section connected to said conical wall, the helix in said pressure section having a decreasing lead and the shaft having a constant diameter at an entrance side of said pressure section; a conically-shaped member on said shaft in an end zone of said pressure section; said screen forming a screened enclosure surrounding said driven screw within said screw conveyor; said conically-shaped member being mounted on a portion of said shaft that is free of helical surfaces for producing compacting of sludge free of thrust thereon in a final region of said pressure section, said sludge being rearranged and mixed by said portion of said shaft that is free of a helical surface so that different areas of sludge come into contact with said screen.

2. An arrangement as defined in claim 1, wherein said screw conveyor has an inclined position.

3. An arrangement as defined in claim 1, including means for cleaning said screen with filtration water; a closed outside wall enclosing said screen; and means for heating sludge to be drained.

4. An arrangement as defined in claim 1, including a flocculation reactor connected to said screw conveyor for carrying out a pre-thickening operation; and a fine screen in said reactor for pre-drainage of sludge.

5. An arrangement as defined in claim 1, including another flocculation reactor located between said first-mentioned flocculation reactor and said screw conveyor and having a screen of substantially large openings for producing a post-thickening operation.

6. A continuously and automatically operating arrangement for draining sewage sludge treated with a flocculent, comprising: a screw conveyor having a driven screw with a shaft and a helix; a screen wall surrounding said driven screw; said screw conveyor having a first cylindrical wall enclosing a substantially large cross-sectional area and a first part of said screen, said first part of said screen having substantially large screen openings; a conical wall connected to said first cylindrical wall and having a cross-sectional area that decreases in direction of flow through said screw conveyor; a pressure section connected to said conical wall, the helix in said pressure section having a decreasing lead and the shaft having a constant diameter at an entrance side of said pressure section; a conically-shaped member on said shaft in an end zone of said pressure section; said screen forming a screened enclosure surrounding said driven screw within said screw conveyor; said conically-shaped member being mounted on a portion of said shaft that is free of helical surfaces for producing compacting of sludge free of thrust thereon in a final region of said pressure section; said conical wall being a closed wall; said screw conveyor having an inclined position; additional pressure sections arranged in consecutive sequence in the direction of flow, said shaft having increased diameters in sequence in said pressure sections; additional conically-shaped members on said shaft in said additional sections and having increased outside diameters in sequence which a helix free; said screen having openings of reduced width in said pressure sections in the direction of flow, screen openings adjacent said cylindrical wall having a width of substantially 1–0.5 mm, screen openings adjacent said conical wall having a width of substantially 0.25 mm, screen openings in said additional pressure sections having further decreased widths between 0.25 and 0.1 mm; means for rinsing and cleaning said screen with filtration water; an outside wall enclosing said screen; means for heating sludge to be drained; a first flocculation reactor connected to said screw conveyor for carrying out a pre-thickening operation and having a substantially fine screen for pre-drainage of sludge; a second flocculation reactor located between said first flocculation reactor and said screw conveyor and having a screen with substantially large openings for carrying out a post-thickening operation.

7. A continuously and automatically operating arrangement for draining sewage sludge treated with a flocculent, comprising: a screw conveyor having a driven screw with a shaft and a helix; a screen wall surrounding said driven screw; said screw conveyor having a first cylindrical wall enclosing a substantially large cross-sectional area and a first part of said screen, said first part of said screen having substantially large screen openings; a conical wall connected to said first cylindrical wall and having a cross-sectional area that decreases in direction of flow through said screw conveyor; a pressure section connected to said conical wall, the helix in said pressure section having a decreasing lead and the shaft having a constant diameter at an entrance side of said pressure section; a conically-shaped member on said shaft in an end zone of said pressure section; said screen forming a screened enclosure surrounding said driven screw within said screw conveyor; said conically-shape member being mounted on a portion of said shaft that is free of helical surfaces for producing compacting of sludge free of thrust thereon in a final region of said pressure section, said sludge being rearranged and mixed by said portion of said shaft that is free of a helical surface so that different areas of sludge come into contact with said screen; said screw conveyor has additional pressure sections arranged consecutively in sequence in the flow direction, said shaft having increased diameters in said additional pressure sections; said additional pressure sections having additional conically-shaped members on said shaft with correspondingly increased outside diameters that are helix-free.

8. An arrangement as defined in claim 7, wherein said screen has openings of reduced dimensions in said pressure sections located in consecutive sequence in the direction of flow, screen openings adjacent said cylindrical wall having a width of substantially 1–0.5 mm, screen openings adjacent said conical wall having a width of substantially 0.25 mm, and screen openings in subsequent pressure sections having further reduced widths between 0.25 and 0.1 mm.

* * * * *